Oct. 20, 1959    K. R. BROWN ET AL    2,909,075
SERVO CONTROL SYSTEMS
Filed Nov. 4, 1957    2 Sheets-Sheet 1

Inventors
Kenneth Robson Brown
Brian Box English
By
Cameron, Kerkam & Sutton
Attorneys

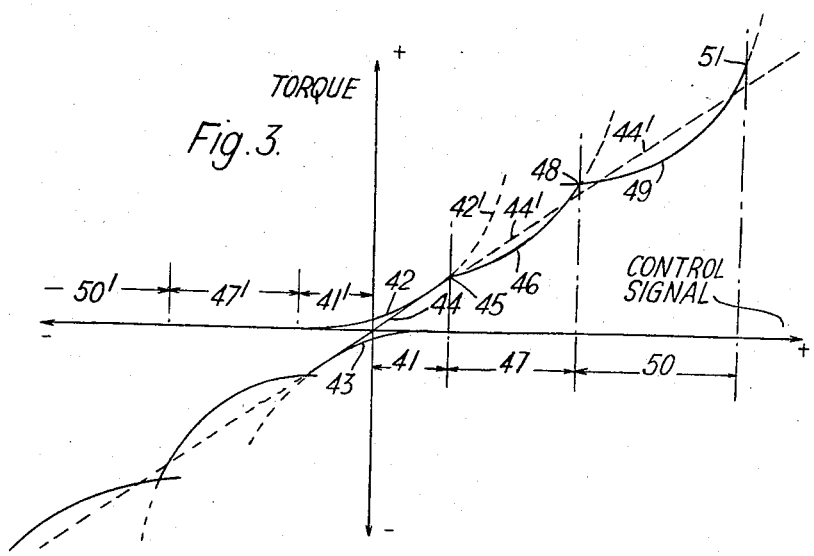
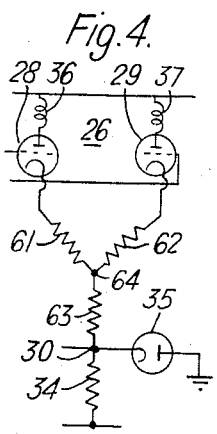

United States Patent Office 2,909,075
Patented Oct. 20, 1959

2,909,075

SERVO CONTROL SYSTEMS

Kenneth R. Brown, Edinburgh, and Brian B. English, Portobello, Midlothian, Scotland, assignors to Ferranti, Limited, Hollinwood, Lancashire, England, a company of Great Britain Application November 4, 1957, Serial No. 694,216

Claims priority, application Great Britain November 8, 1956

7 Claims. (Cl. 74—365)

This invention relates to servo control systems of the type in which the torque developed by an output shaft is required to be dependent in sense and value on the sense and value of an electrical control signal.

A system of this type was disclosed by the present applicants in British patent specification No. 692,203 as comprising two electrically controlled clutches for transmitting to said output shaft from a suitable power source oppositely-acting torques which are in like proportion to the squares of the respective control currents of said clutches, and means, which may include a push-pull amplifier, for deriving said control currents such that their sum is constant and their difference is dependent in sense and value on the sense and value of the control signal.

It was shown that with control currents as defined, the torque developed by the output shaft had the required dependence in sense and value on the control signal.

An embodiment of the invention disclosed in British specification No. 692,203 will now be described with reference to Figure 1 of the drawings accompanying the present application.

Electrically-controlled friction clutches A and B have their respective driving shafts C and D coupled by bevel gears E and F to a common shaft G so as to be driven in opposite directions by a suitable power source, shown as a motor H, which rotates shaft G continuously at a constant speed. The directions of rotation of shafts C, D, and G are indicated by the arrows.

The respective driven shafts J and K of the clutches are geared to the output shaft L so as to act oppositely on it; this may be effected, as shown, by gear wheels M and N secured to shaft J and K respectively and engaging a third gear wheel O secured to output shaft L.

The control windings of the clutches are included in the anode circuits of push-pull amplifier valves P and Q, respectively, which are driven by some form of phase-splitter stage R to which the control signal is applied over a channel S.

The clutches are each of the kind that transmits torque in proportion to the square of the control current; the constants of proportionality are the same, so that the clutches transmit to the output shaft L oppositely-acting torques which are in like proportion to the squares of the respective control currents, $i_1$ and $i_2$.

A typical clutch of this kind, to which however the invention is not limited, is the well-known electromagnetically-controlled friction clutch in which the torque is transmitted by the friction between a pair of discs or drums; these discs are pressed together with a variable force determined by an electromagnet which is energized by the control current. As in normal operation a certain amount of slip is present in each clutch the contact surfaces of the discs are faced with some heat-resisting material.

The two control currents $i_1$ and $i_2$ for the clutches are derived from the control signal in such a way that whereas the sum of the currents is constant their difference depends in sense and value on the sense and value of the error signal. The reason for these requirements is as follows.

As the clutches act oppositely on output shaft L the torque transmitted to this shaft is proportional to $(i^2_1 - i^2_2)$. It is assumed for clarity of explanation that the shaft rotates in a "positive" sense (as indicated by arrow T) in the direction determined by clutch A, that is to say the shaft rotates in this sense if the current $i_1$ is the greater; if on the other hand the current $i_2$ is the greater the shaft rotates in the opposite direction, i.e. a "negative" sense.

The above expression may be written $(i_1-i_2)(i_1+i_2)$: from which it will be seen that if the sum of the currents is kept constant the torque transmitted to the output shaft is dependent in sense and value on the sense and value of the difference between the currents. If then this difference is made dependent in sense and value on the control signal the torque developed by the output shaft has the required dependence in sense and value on this signal.

With such an arrangement a difficulty is experienced in maintaining linearity of operation—that is, a straight-line relationship between control signal and torque, after one or other of the push-pull valves P or Q reaches cut-off. A related difficulty arises due to the fact that in order to allow a sufficient range of linear operation the control currents in the vicinity of zero control signal, and hence the torques then transmitted by the clutches individually, are comparatively large, and as in this range of the control signal both clutches are slipping to nearly their maximum extent considerable wear of clutch surfaces takes place, especially where the power to be transmitted has a substantial value.

An object of the present invention is to provide a servo control system of the type stated in which range of approximate linearity of operation is large without resulting in appreciable clutch wear at low values of the control signal.

In accordance with the present invention a servo control system of the type in which the torque developed by an output shaft is required to be dependent in sense and value on the sense and value of a control signal includes two friction clutches arranged to be operated by energisation of electrical control windings and to transmit from a suitable power source to said output shaft oppositely-acting torques which are in like proportion to the squares of the respective currents in said windings, an output stage including two output amplifier components in linear push-pull association adapted respectively to feed said windings, an input stage for deriving from the control signal push-pull output signals the sum of which is constant and the difference between which is dependent in sense and value on the sense and value of the control signal, means for applying these output signals to the input circuits of said two amplifier components, and, common to said amplifier component, a feedback voltage network whereby when either component is driven beyond cut-off the gain of said output stage is reduced sufficiently to maintain approximate linearity of operation of the system.

In the accompanying drawings,

Figure 3 shows characteristic curves to illustrate the operation of the embodiment of Figure 2, and Figure 4 shows a modified arrangement of a part of Figure 2 in accordance with another embodiment.

Figure 2:
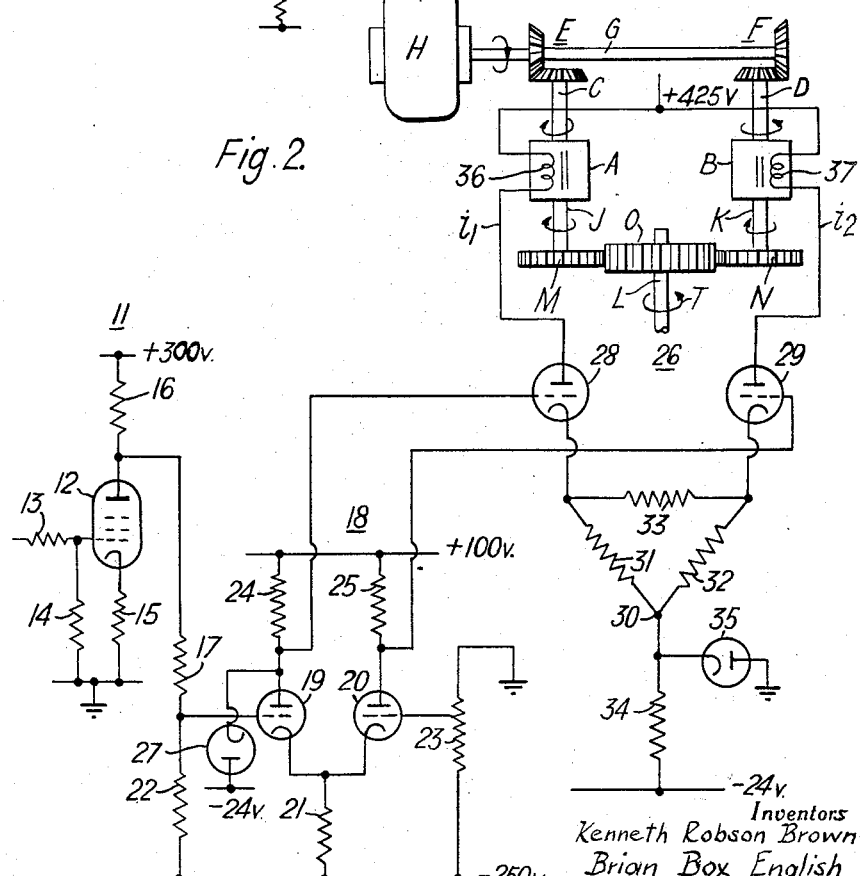
Figure 2 is a diagram of connections of one embodiment of the invention.

In carrying out the invention in accordance with one form by way of example, see Figure 2, a servo control system includes an initial stage 11 comprising a pentode valve 12 to the control grid of which the control signal is applied by way of a resistor 13, this grid and the cathode being earthed by resistors 14 and 15 respectively. Conventional connections (not shown) are made to the other grids of the valve. The anode is connected by way of a load resistor 16 to a source of 300 volts positive and by way of a resistor 17 to an input push-pull amplifier stage 18.

Stage 18 includes two triode valves 19 and 20 in push-pull association and cathode-coupled by a resistor 21 to a source of 250 volts negative. The output from stage 11 is applied to the grid of valve 19, which grid is connected to the —250 volt source by a resistor 22. The grid of valve 20 is connected to a tapping on potentiometer 23 connected between earth and the —250 volt source. The anodes are connected by load resistors 24 and 25 respectively to a source of 100 volts positive and to an output push-pull amplifier stage 26. The anode of valve 19 is further connected to the cathode of a diode 27 the anode of which is connected to a source of 24 volts negative.

Figure 1:
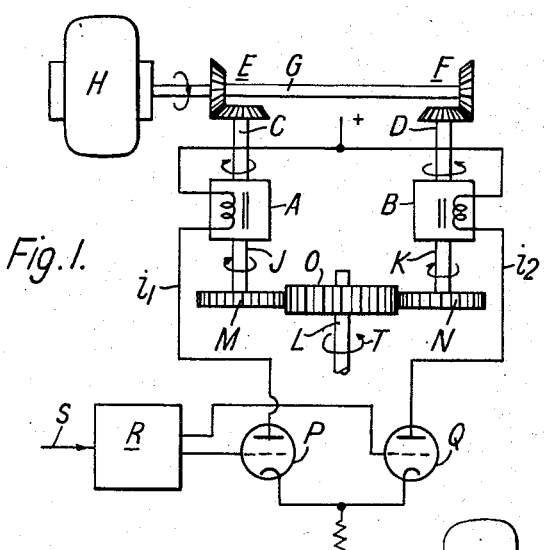
Figure 1 is a schematic diagram of a known form of servo system.

Stage 26 includes valves 28 and 29 (which may conveniently be triodes) in push-pull association, to the control grids of which the outputs from valves 19 and 20 are respectively applied. The cathodes are connected to a common point 30 by resistors 31 and 32 respectively and to one another by a resistor 33, the three resistors being thus in a delta arrangement. Common point 30 is connected to the —24 volt source by a resistor 34 and to the cathode of a diode 35 the anode of which is earthed. The anodes are connected to a source of 425 volts positive by way of the respective control windings 36 and 37 of two friction clutches. These clutches are designed to transmit to an output shaft L from a suitable power source H oppositely-acting torques which are in like proportion to the squares of the respective control currents in the windings 36 and 37. The arrangement of clutches, power source, and output shaft may be as described with reference to Figure 1, it being understood that, in such an arrangement, the circuitry of Figure 2 would simply replace the phase-splitter stage R, amplifier valves P and Q, and the windings of clutches A and B, the control windings 36 and 37 of Figure 2 being substituted for the unlettered windings in Figure 1.

In operation, stages 11 and 18 act in known manner to apply to the control grids of triodes 28 and 29 push-pull potentials the sum of which is constant and the difference between which is dependent in sense and value on the sense and value of the control signal, these valves respectively feeding the control windings 36 and 37. The circuit constants of stage 26 are such that the currents taken by the valves when the control signal is at and near zero are comparatively small, thereby causing negligible wear of the friction surfaces of the clutches under these conditions of operation.

Reference will now be made to the characteristic curves of Figure 3. These relate the values of the control signal to the corresponding values of the output torque. One of the two senses of the signal and the corresponding direction of action of the torque are deemed "positive" and are so plotted, the opposite sense of the signal and direction of torque being plotted as negative. To simplify the explanation only the positive signals and torques will at first be considered.

Within the range 41 (see Fig. 3) of positive values of the control signal, valves 28 and 29 operate in linear push-pull. The torques transmitted by the clutches therefore follow the like but opposite square-law characteristics 42 and 43; the resultant torque at the output shaft accordingly follows the straight-line characteristic 44. As the result of restricting the zero-signal valve currents so as to minimise clutch wear, as described above, this range of linear operation is too small for practical purposes. The range of operation is therefore extended, whilst maintaining approximate linearity, as follows.

The end 45 of linear operation is reached when one or other of valves 28 and 29 is cut off. The clutch in the anode circuit of this valve therefore ceases to transmit a torque, the only torque reaching the output shaft being that transmitted by the other clutch. With further increase of the control signal the output torque would follow the square-law characteristic $42^1$—the continuation of characteristic 42—of the clutch still operating, and an intolerable departure from linearity of operation would result. Such a considerable departure is however prevented by the action of the feedback network in the cathode circuits of stage 26.

The delta arrangement of resistors 31 to 33 (and resistor 34 when not short-circuited by diode 35 in a manner to be described) are common to the input and output circuits of the valves in this stage and so clearly act as a combined feedback-voltage network. Within the linear range 41 of operation the point 30 remains at a negative potential, with the result that resistor 34 is short-circuited by diode 35. As within this range the valves 28 and 29 operate in linear push-pull their cathode potentials respectively rise and fall to equal extents. The centre point of resistor 33 thus remains at some constant potential. The effective cathode resistance in the circuit of valve 28 across which the feedback voltages are developed is thus the resistance of the combination of resistor 31 in parallel with half resistor 33. Similarly the feedback voltages of valve 29 are developed across an effective resistance equal to that of the parallel combination of resistor 32 and half resistor 33. Under these conditions the feedback is appropriate to the desired gain of the stage during linear operation.

When valve 28 is driven beyond cut-off, however, the effective cathode resistance in the circuit of valve 29 becomes that of the parallel combination of resistor 32 with resistors 31 and 33 in series. Clearly this resistance is much greater than when neither valve was cut-off. The degree of feedback is therefore increased and the gain of the stage reduced in consequence.

The gain is similarly reduced when the valve which is cut off is valve 29.

The effect in either case is to cause the output current of the valve which is not cut off to rise less steeply with increase of grid potential, so that the torque characteristic of the clutch still in operation becomes less steep, having now the square-law form 46, instead of the square-law form $42^1$. Clearly, by suitably adjusting the values of the resistors in the feedback network the reduction in gain may be caused to be such that characteristic 46 approximates very closely to the continuation $44^1$ of the linear characteristic 44 in the range 41. Approximate linearity of operation is thereby maintained within an extended range 47.

By the end 48 of this range the characteristic 46 is beginning to diverge too much from the line $44^1$. Stage 26 is therefore arranged so that at this point the sum of the output currents of the valves in this stage—that is, since one valve is cut off, the cathode current of the valve in operation—attains a predetermined value sufficient to carry the potential of the point 30 positive. This causes diode 35 to be cut off and so effectively increases the resistance of the feedback network still further by adding resistor 34 to it. The gain of stage 26 is thereby reduced still further, with the result that the torque characteristic of the motor in operation takes the square-law form 49, which again approximates to the desired straight-line characteristic $44^1$. Thus the range of approximate linear operation is increased to a further extent 50, until the torque characteristic begins at the point 51 again to depart too much from linearity.

The operation is similar when the control signal is of negative sense. The valve and clutch previously in operation are now cut out and the output shaft rotates in the reverse, or "negative," direction. The torque characteristic thus follows the form indicated in the negative quadrant of Fig. 3, substantial linearity being maintained over ranges 41¹, 47¹ and 50¹.

The function of diode 27 associated with triode valve 19 is to ensure a positive-going potential of large enough swing at the anode of the other triode valve 20. There is no difficulty in achieving this potential swing at the anode of valve 19, since all that is required here is a control signal at the grid of valve 19 of large enough negative-going extent. To secure this for valve 20, however, requires a very large current flow in valve 19, and this is attained by means of diode 27, through which valve 19 can draw a large current. As the anode of valve 19 is connected to the control grid of valve 28, it is essential that the anode of diode 27 be connected to a point of potential more negative than that required on the grid of valve 28 to cut off its cathode current, otherwise valve 28 cannot be driven to cut-off.

It will thus be seen that by the system in accordance with the invention a wide range of substantially linear operation is achieved with the further advantage that at zero value of the control signal, or at values of it near zero, the currents through the clutch control windings are not large enough to cause appreciable wear of the clutch friction surfaces.

Various details of the above described embodiment may be varied within the scope of the invention. The feedback network of stage 26 may for example take other forms than that described as long as it is such as to provide the required increase in the degree of feedback when one of the valves becomes cut off. For example, the delta arrangement of resistors 31 to 33 between common point 30 and the cathodes of the two output valves 28 and 29 of Fig. 2 may be replaced by the star arrangement of resistors 61 to 63 connecting the two cathodes and common point 30 to a star point 64 as shown in Fig. 4, in which the components already described with reference to Fig. 2 are designated as before. In operation, so long as both valves are operating linearly, the total current $i_1+i_2$ in resistor 63 is constant. As soon as either valve is cut off the total current in resistor 63 changes in the sense appropriate to increasing the feedback and hence decreasing the gain.

The Fig. 2 arrangement is generally to be preferred, since resistor 33 need only be of comparatively low power value compared with the third resistor 63 of the Fig. 4 arrangement.

In either of the arrangements of Figs. 2 or 4, valves 28 and 29 may be other than triodes, or may be junction-type transistors. Such transistors replace the valves so that the collector, base, and emitter electrodes are connected in circuit as are the anode, grid, and cathode electrodes, respectively, of the valves. It will of course be appreciated that the values of the various resistors and other associated components and the values and senses of the various polarising potentials must be modified to suit transistor operation.

What we claim is:

1. A servo control system of the type having an output shaft in which the torque developed by said shaft is required to be dependent in sense and value on the sense and value of an electrical control signal including two friction clutches arranged to be operated by energisation of electrical control windings and to transmit from a suitable power source to said output shaft oppositely-acting torques which are in like proportion to the squares of the respective currents in said windings, an output stage including two output amplifier components in linear push-pull association adapted respectively, to feed said windings, an input stage for deriving from the control signal push-pull output signals the sum of which is constant and the difference between which is dependent in sense and value on the sense and value of the control signal, means for applying these output signals to the input circuits of said two amplifier components, and, common to said amplifier components, a feedback voltage network whereby when either component is driven beyond cut-off the gain of said output stage is reduced sufficiently to maintain approximate linearity of operation of the system.

2. A system as claimed in claim 1 wherein said network includes a delta arrangement of three resistors one of which connects to one another the electrodes of said amplifier components which are common to the input and output circuits thereof and the other two of which resistors connect those electrodes to a point common to said input and output circuits.

3. A system as claimed in claim 1 wherein said network includes a star arrangement of three resistors two of which connect to a star point the electrodes of said amplifier components which are common to the input and output circuits thereof, and the third of which resistors connects to said star point a point common to said input and output circuits.

4. A system as claimed in claim 1 wherein gain-reducing means are provided for automatically increasing the effective resistance of said feedback network when the sum of the output currents of said amplifier components reaches a predetermined value, thereby further reducing said gain.

5. A system as claimed in claim 4 wherein said gain-reducing means includes a resistor arranged to be short-circuited by a diode or the like until said sum reaches said value.

6. A system as claimed in claim 1 wherein the circuit constants of said output stage are such that the currents taken by the amplifier components at and near zero value of said control signal are comparatively small, thereby reducing wear of the friction surfaces of the clutches.

7. A system as claimed in claim 1 wherein each of said amplifier components is a discharge tube having a control grid, said output signals are potentials, and said input circuits are the grid-cathode circuits of said tubes.

References Cited in the file of this patent

UNITED STATES PATENTS

| | | |
|---|---|---|
| 2,412,263 | Hartig | Dec. 10, 1946 |
| 2,520,485 | Wild | Aug. 29, 1950 |
| 2,603,103 | Sohon et al. | July 15, 1952 |